March 21, 1967 V. STRÓBL 3,310,072

GRIPPER FOR GRIPPER LOOMS

Filed March 2, 1965

INVENTOR:
VACLAV STRÓBL

BY

Michael J. Striker
his ATTORNEY 3,310,072
GRIPPER FOR GRIPPER LOOMS
Václav Stróbl, Liberec, Czechoslovakia, assignor to
Elitex, Liberec, Czechoslovakia
Filed Mar. 2, 1965, Ser. No. 436,519
Claims priority, application Czechoslovakia,
Mar. 5, 1964, 1,258/64
13 Claims. (Cl. 139—125)

The present invention relates to textile machinery in general, and more particularly to a gripper for gripper looms. Still more particularly, the invention relates to improvements in the construction and mounting of springs in grippers for gripper looms.

In conventional grippers for gripper looms, the spring is received in and fastened to a hollow housing. The fastening means normally comprises screws or rivets which wear away or are sheared off so that the spring ceases to be connected with the housing. If an overstressed or damaged spring is to be removed or replaced, the removal of screws or rivets consumes much time and must be carried out by resorting to special tools.

Accordingly, it is an important object of the present invention to provide a novel and improved gripper for gripper looms wherein the spring may be rapidly inserted and readily removed from the housing, wherein the spring need not be permanently secured to the housing but invariably remains in optimum position, and wherein the spring may be removed by semiskilled or unskilled persons by resorting to rudimentary and readily available tools.

Another object of the invention is to provide a very simple and readily separable connection between the spring and the housing of a gripper for gripper looms and to construct the connection in such a way that its components form integral parts of the spring and/or housing.

A further object of the invention is to provide a novel spring which may be used in such types of grippers.

An additional object of the invention is to provide an improved housing for use in a gripper of the above outlined characteristics.

Still another object of the invention is to provide a gripper for gripper looms wherein the spring is stressed in a fully automatic way in response to insertion into the housing, and wherein such stressing suffices to insure satisfactory retention of the spring in its housing.

Briefly stated, one feature of my invention resides in the provision of a gripper for gripper looms which comprises an elongated housing defining a longitudinally extending internal chamber which is open at one end, and a prestressed leaf spring which is accommodated in and is readily removable through the open end of the chamber.

In accordance with a more specific feature of the invention, the housing comprises a pair of relatively narrow side walls, a slotted bottom wall and a top wall which is provided with a hole and with a cutout, the cutout being adjacent to but spaced from the open end of the chamber. The spring comprises a first end portion which extends into the hole to thereby anchor the spring in the top wall, a second end portion which bears against the top wall in a zone between the cutout and the open end of the chamber, and a median portion which bears against the bottom wall. If the operator desires to remove the spring, the first end portion is simply expelled from the hole and into the chamber, whereupon the spring is readily withdrawable through the open end of the chamber. The insertion of the spring is carried out by pushing the spring through the open end of the chamber until the first end portion snaps into the hole to anchor it in the top wall of the housing.

The novel features which are considered as characteristic of the invention are set forth in particular in the appended claims. The improved gripper itself, however, both as to its construction and the mode of assembling the same, together with additional features and advantages thereof, will be best understood upon perusal of the following detailed description of certain specific embodiments with reference to the accompanying drawings, in which:

Figure 1:
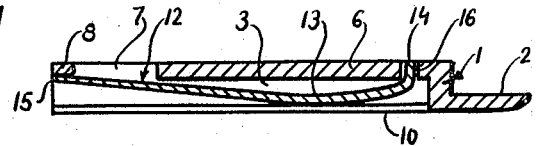
FIG. 1 is a central longitudinal section through a gripper whose housing accommodates a leaf spring constructed and mounted in accordance with a first embodiment of my invention.
Figure 2:
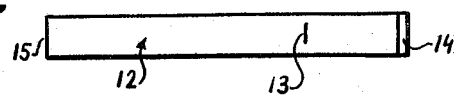
FIG. 2 is a top plan view of the spring which is used in the gripper of FIG. 1.

Referring to the drawings, and first to FIGS. 1, 2, 7 and 8, the gripper comprises an elongated housing 1 of rectangular cross section. The housing comprises two narrow side walls 4, 5, a wider bottom wall 10 which is provided with a centrally located longitudinally extending slot 11, and an equally wide top wall 6. These walls together define an elongated internal chamber 3 of constant rectangular cross section, and the left-hand end of the chamber 3 (as viewed in FIG. 1 or 7) is open so as to allow for convenient insertion or withdrawal of a prestressed leaf spring 12. The top wall 6 is formed with a recess or hole or opening 16 which is adjacent to the closed end of the chamber 3, and with a substantially circular cutout 7 which is adjacent to but slightly spaced from the open end of the chamber. A lip 8 extends from the side wall 4 toward but short of the side wall 5 so that the cutout 7 communicates with a narrow gap 9 provided in the top wall 6 and extending all the way to the open end of the chamber 3.

The spring 12 comprises a bent-over end portion or tip 14 which is received in the hole 16 so that the spring is removably anchored in the top wall 6. The other end portion 15 of the spring 12 is flat and bears against the inner side of the lip 8, and a median portion 13 of the spring bears against the inner side of the bottom wall 10. In its unstressed condition, the spring 12 resembles a V-shaped body whose legs make an obtuse angle and must be spread apart in order to insert the spring through the open end of the chamber 3, i.e., the spring is invariably stressed when its end portion 14 snaps into the hole 16. The end portion 15 of the spring 12 presses the weft thread against the lip 8 when the gripper is in actual use.

Figure 7:
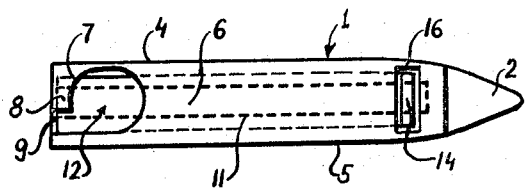
FIG. 7 is a top plan view of the gripper shown in FIG. 1.
Figure 8:
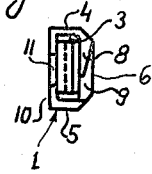
FIG. 8 is an end elevational view of the gripper as seen from the left-hand side of FIG. 7.

In order to remove the spring 12 from the housing 1, the operator simply depresses the end portion 14 so that this end portion enters the right-hand end of the chamber, whereupon the spring is withdrawn in a direction to the left, as viewed in FIG. 1 or 7.

Figure 3:
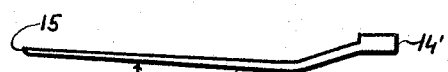
FIG. 3 is a side elevational view of a slightly modified spring.
Figure 4:
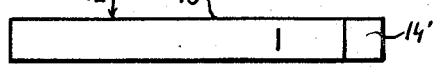
FIG. 4 is a top plan view of the spring shown in FIG. 3.

FIGS. 3 and 4 illustrate a slightly modified spring 12' whose end portion 14' is of square outline and comprises a raised platform-like part which will snap into a complementary hole or recess of the top wall.

Figure 5:
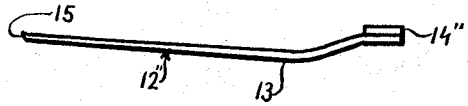
FIG. 5 is a side elevational view of a third spring.
Figure 6:
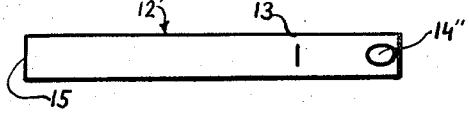
FIG. 6 is a top plan view of the spring shown in FIG. 5.

The spring 12" of FIGS. 5 and 6 comprises an end portion 14" which also includes a raised platform-like part, but this part is of substantially circular or oval outline and may snap into a complementary recess or hole in the top wall of the housing. In other words, that end portion of the spring which is to be removably anchored in the top wall of the housing may take the shape of a circular, oval or polygonal body and is receivable in a complementary recess or hole of the top wall. In all instances, the connection between the housing and the spring is of such nature that it can be terminated in a very simple manner, without resorting to special tools, and by exertion of a minimal effort.

The thickness of the lip 8 diminishes in a direction from the side wall 4 toward the side wall 5, and the length of the slot 11 in the bottom wall 10 normally equals the length of the chamber 3.

The front end of the housing 1 is formed with a forwardly projecting flattened nose or tip 2 which enables the gripper to penetrate the shed.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be secured by Letters Patent is:

1. A gripper for gripper looms, comprising an elongated hollow housing defining a longitudinally extending internal chamber open at one end thereof, said housing having a first wall and a second wall, respectively disposed at the opposite sides of said chamber; and a leaf spring removably accommodated in said chamber, said spring having a first and a second end portion, said first end portion engaging said first wall at a first point distant from the open end of said chamber and said second end portion engaging said first wall at a second point adjacent to the open end of said chamber, and a median portion engaging only said second wall so that said leaf spring is retained in said chamber and stressed by engagement with said walls and forms with said first wall a clamping means.

2. A gripper for gripper looms, comprising an elongated hollow housing defining a longitudinally extending internal chamber which is open at one end thereof, said housing having a pair of spaced walls disposed at the opposite sides of said chamber and one of said walls having a recess communicating with said chamber and being distant from said open end thereof; and a prestressed leaf spring removably accommodated in said chamber, said spring having a first end portion extending into said recess, a second end portion bearing against said one wall adjacent to the open end of said chamber, and a median portion bearing against the other of said walls.

3. A gripper as set forth in claim 2, wherein said recess is a hole extending through said one wall.

4. A gripper for gripper looms, comprising an elongated hollow housing defining a longitudinally extending internal chamber open at one end thereof, said housing having two pairs of opposed walls surrounding said chamber and one wall of one of said pairs having a hole distant from the open end of said chamber and a cutout adjacent to but slightly spaced from said open end, said one wall further having a lip located between said cutout and said open end and extending from the one toward but short of the other wall of the other pair of said walls; and a prestressed leaf spring accommodated in said chamber, said spring having a first end portion extending into said hole, a second end portion bearing against said lip, and a median portion bearing against the other of said one pair of walls.

5. A gripper as set forth in claim 4, wherein said housing is of substantially rectangular cross section and wherein the width of said one pair of walls exceeds the width of the other pair of walls.

6. A gripper as set forth in claim 4, wherein the other wall of said one pair of walls is provided with a slot which communicates with and whose length equals the length of said chamber.

7. A gripper as set forth in claim 4, wherein the thickness of said lip diminishes in a direction from said one toward said other wall of said other pair of walls and wherein said lip and said other wall of said other pair of walls define between themselves a narrow gap communicating with said cutout and extending to the open end of said chamber.

8. A gripper for gripper looms, comprising an elongated hollow housing of substantially rectangular cross section, said housing including two side walls, a bottom wall and a top wall having a hole distant from one end of said housing and a cutout adjacent to said one end, said top wall comprising a lip extending from the one toward but short of the other side wall and located between said cutout and said one end of the housing, said walls together defining an elongated internal chamber which is open at said one end of the housing; and a prestressed leaf spring received in said chamber, said spring having a first end portion extending into said hole to anchor the spring in said top wall, a second end portion bearing against said lip, and a median portion bearing against said bottom wall, said spring being withdrawable through the open end of said chamber.

9. A gripper as set forth in claim 8, wherein said first end portion of the spring is bent upwardly with reference to the remainder of the spring.

10. A gripper as set forth in claim 8, wherein said first end portion of the spring is of polygonal outline.

11. A gripper as set forth in claim 8, wherein said first end portion of the spring is of substantially circular outline.

12. A gripper for gripper looms, comprising an elongated hollow housing of substantially rectangular cross section, said housing including two side walls, a bottom wall and a top wall having a hole distant from one end of said housing and a cutout adjacent to said one end, said top wall comprising a lip extending from the one toward but short of the other side wall and located between said cutout and said one end of the housing, said walls together defining an elongated internal chamber which is open at said one end of the housing and which is of constant rectangular cross section; and a prestressed leaf spring received in said chamber, said spring having a first end portion extending into said hole to anchor the spring in said top wall, a second end portion bearing against said lip, and a median portion bearing against said bottom wall, said spring being withdrawable through the open end of said chamber.

13. A gripper for gripper looms, comprising an elongated hollow housing of substantially rectangular cross section, said housing including two side walls, a bottom wall and a top wall having a hole distant from one end of said housing and a cutout adjacent to said one end, said top wall comprising a lip extending from the one toward but short of the other side wall and located between said cutout and said one end of the housing, said walls together defining an elongated internal chamber which is open at said one end of the housing; and a prestressed leaf spring received in said chamber, said spring having a first end portion extending into said hole to anchor the spring in said top wall, a flat second end portion bearing against said lip, and a median portion bearing against said bottom wall, said spring being withdrawable through the open end of said chamber.

References Cited by the Examiner

UNITED STATES PATENTS

| | | | |
|---|---|---|---|
| 8,902 | 4/1852 | Dewey | 139—131 |
| 2,693,829 | 11/1954 | Turner | 139—125 |
| 2,946,353 | 7/1960 | Dunham | 139—125 |
| 3,144,884 | 8/1964 | Svaty | 139—125 |
| 3,237,653 | 3/1966 | Klein et al. | 139—125 |

FOREIGN PATENTS 402,216  8/1909  France.

MERVIN STEIN, *Primary Examiner.*

J. KEE CHI, *Assistant Examiner.*